I. E. PIPPERT.
HEADLIGHT CONTROL.
APPLICATION FILED MAY 27, 1919.
1,356,470.
Patented Oct. 19, 1920.
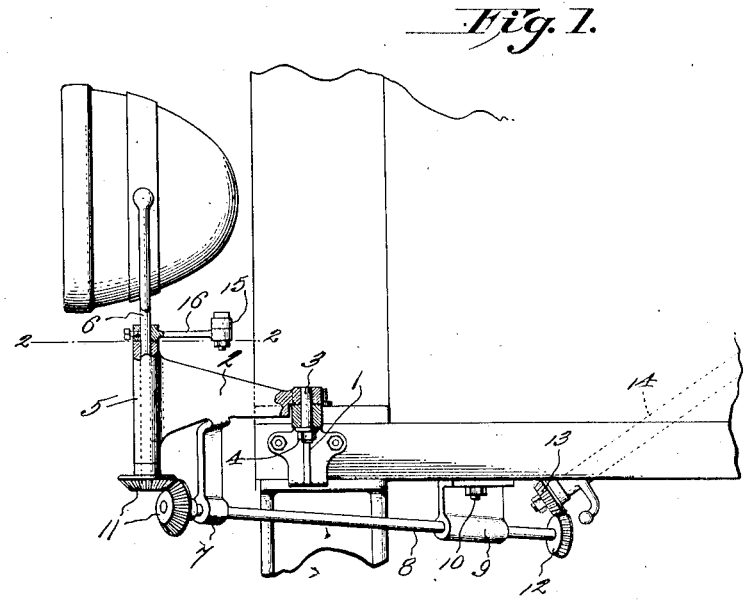
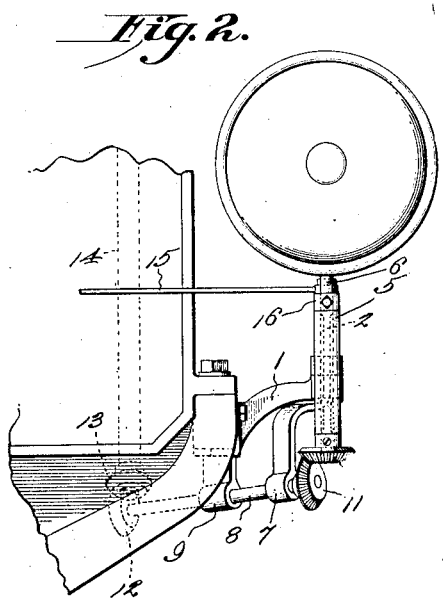
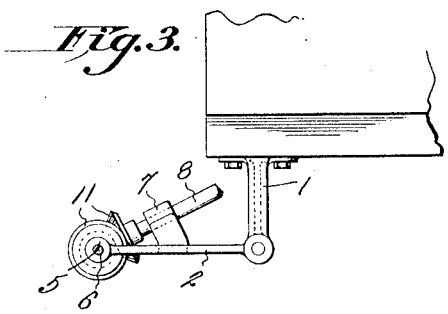
Inventor
I. E. Pippert,
By Victor J. Evans
Attorney
Witnesses

UNITED STATES PATENT OFFICE.

IRVIN E. PIPPERT, OF DEL NORTE, COLORADO.

HEADLIGHT CONTROL.

1,356,470.  Specification of Letters Patent.  Patented Oct. 19, 1920.

Application filed May 27, 1919. Serial No. 300,070.

*To all whom it may concern:*

Be it known that I, IRVIN E. PIPPERT, a citizen of the United States, residing at Del Norte, in the county of Rio Grande and State of Colorado, have invented new and useful Improvements in Headlight Controls, of which the following is a specification.

This invention relates to dirigible headlights for automobiles and one of the objects of the invention is to connect the standards of the headlights with the steering post so as to communicate the movement of said post to said standards.

Another object of the invention is to provide means whereby the different parts of the invention can be readily attached to the automobile without requiring any change to existing parts of the automobile.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a fragmentary side view of an automobile supplied with my invention, parts being shown in section.

Fig. 2 is a fragmentary front view of the invention applied upon an automobile.

Fig. 3 is a section on line 2—2 of Fig. 1.

In these views 1 indicates the usual lamp supporting brackets which are connected to the sides of the automobile frame adjacent the radiator. I remove the lamps from these brackets and to each bracket I connect a bracket 2. Each of these brackets 2 has a depending shaft 3 at its rear end which fits into the socket of the lamp bracket 1 and is secured thereto by having its screw-threaded end receiving the nut 4. Thus the bracket 2 is secured to the lamp bracket 1. The front part of the bracket 2 has formed thereon a sleeve 5 through which the lamp standard 6 passes. I provide suitable ball bearings for these parts. The lower edge of the bracket 2 has formed thereon an inclined sleeve 7 which forms a journal for the outer end of the shaft 8. The other end of this shaft 8 is journaled in a bracket 9 which is secured to the lower edge of the side bars of the frame of the automobile by one of the bolts 10. The ends of the lamp standard 6 and the shaft 8 are provided with the beveled gears 11 meshing with each other and the inner end of the shaft 8 is provided with a beveled gear 12 which meshes with a gear 13 secured to the lower end of the steering post 14. In this way when the steering post is rotated to turn the front wheels, the movement thereof will be transmitted through the gears and shaft 8 to the lamp standard 6 so that the lamps will follow the movement of the front wheels. In order to cause both lamps to move I connect the two standards together by the bar 15 having its ends pivoted to the arms 16 which are connected with the lamp standards.

It will thus be seen that the different parts of my invention may be applied to existing models of automobiles without changing the construction thereof.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with the steering post and lamp brackets of an automobile, of supporting brackets secured to said lamp brackets, said supporting brackets having vertically arranged sleeves formed thereon for receiving the lamp standards, means for connecting the standards of the lamps together, a gear connected with the end of the steering post, a shaft having one end journaled in the supporting bracket, means for supporting the other end from the automobile frame, a gear on said shaft meshing with the before-mentioned gear and gears connecting the shaft and lamp standard together.

2. In combination with the steering post and lamp brackets of an automobile, a gear on the end of the steering post, a pair of supporting brackets each having a depending shaft engaging the socket in the lamp bracket, a nut engaging the end of said shaft, a vertical sleeve formed on the outer edge of each supporting bracket for receiving the lamp standard, an inclined sleeve formed on the lower edge of one of the brackets, a shaft having one end supported in said sleeve, a bracket supporting the other end of the shaft and connected with the frame of the automobile, a gear on said shaft meshing with the gear on the steering post, a beveled gear connected with the other end of said shaft, a beveled gear connected with the lower end of one of the lamp standards and meshing with the before mentioned beveled gear, arms on each of said standards and a bar connecting said arms together.

In testimony whereof I affix my signature.

IRVIN E. PIPPERT.